(12) United States Patent
Suwa et al.

(10) Patent No.: US 12,253,134 B2
(45) Date of Patent: Mar. 18, 2025

(54) COIL SPRING DEVICE

(71) Applicant: NHK SPRING Co., Ltd., Yokohama (JP)

(72) Inventors: Taisuke Suwa, Yokohama (JP); Yuichi Shibata, Yokohama (JP); Ippei Kokubun, Yokohama (JP); Tomoya Sugitani, Yokohama (JP)

(73) Assignee: NHK SPRING CO., LTD., Kanagawa (JP)

(*) Notice: Subject to any disclaimer, the term of this patent is extended or adjusted under 35 U.S.C. 154(b) by 288 days.

(21) Appl. No.: 17/954,907

(22) Filed: Sep. 28, 2022

(65) Prior Publication Data

US 2023/0016117 A1    Jan. 19, 2023

Related U.S. Application Data

(63) Continuation of application No. PCT/JP2021/012287, filed on Mar. 24, 2021.

(30) Foreign Application Priority Data

Mar. 31, 2020  (JP) ................................ 2020-064642

(51) Int. Cl.
  *F16F 3/12*        (2006.01)
(52) U.S. Cl.
  CPC .......... *F16F 3/12* (2013.01); *F16F 2226/042* (2013.01); *F16F 2230/0005* (2013.01)
(58) Field of Classification Search
  None
  See application file for complete search history.

(56) References Cited

U.S. PATENT DOCUMENTS

| 6,398,201 B1 | 6/2002 | Solomond et al. |
| 2011/0233836 A1 | 9/2011 | Sawai |

(Continued)

FOREIGN PATENT DOCUMENTS

| CN | 1576638 A | * | 2/2005 | ........... B60G 15/068 |
| CN | 106104062 A | | 11/2016 | |

(Continued)

OTHER PUBLICATIONS

KR 20230006187A—English Machine Translation (Year: 2023).*

(Continued)

*Primary Examiner* — Melanie Torres Williams
(74) *Attorney, Agent, or Firm* — CANTOR COLBURN LLP

(57) ABSTRACT

A coil spring includes a main body spring and an insulator, the insulator is provided with a support groove which extends around a coil axis and into which a lower end portion of the main body spring is fitted, a lower end portion of the main body spring adheres to an inner surface of the support groove, the inner surface of the support groove is provided with a plurality of spacer protrusions which support an outer peripheral surface of a wire rod, the support groove extends in an angle range of 180° or more and 360° or less around the coil axis, and a ratio of a volume of the spacer protrusions occupying a gap between the inner surface of the support groove and the outer peripheral surface of the wire rod at a center portion in the gap in a circumferential direction around the coil axis is larger than that at the other portions in the gap in the circumferential direction.

2 Claims, 2 Drawing Sheets

(56) References Cited

U.S. PATENT DOCUMENTS

2016/0333956 A1  11/2016  Teichmann et al.
2017/0015171 A1   1/2017  Enomoto et al.

FOREIGN PATENT DOCUMENTS

| CN | 208702986    | U  |   | 4/2019  |
|----|--------------|----|---|---------|
| CN | 110573361    | A  |   | 12/2019 |
| EP | 1128085      | A2 |   | 8/2001  |
| EP | 3124821      | A1 |   | 2/2017  |
| FR | 1341188      | A  |   | 9/1963  |
| JP | H0642563     | A  | * | 2/1994  |
| JP | 2015190538   | A  |   | 11/2015 |
| JP | 2017015249   | A  |   | 1/2017  |
| JP | 2019148273   | A  |   | 9/2019  |
| KR | 200370482    | Y1 |   | 12/2004 |
| KR | 1020230006187| A  | * | 1/2023  |

OTHER PUBLICATIONS

CN-1576638-A—English Machine Translation (Year: 2005).*
JPH0642563A—English Machine Translation (Year: 1994).*
EPO Extended European Search Report for corresponding EP Application No. 21779517.8; Mailing Date, Sep. 15, 2023.
International Search Report for International Application No. PCT/JP2021/012287; Date of Mailing, Jun. 1, 2021.
CNIPA Office Action for corresponding CN Application No. 202180024447.0, dated Jan. 18, 2025; see Machine Translation of Search Report.

* cited by examiner

COIL SPRING DEVICE

CROSS-REFERENCE TO RELATED APPLICATIONS

This application is a continuation 35 U.S.C. § 120 of PCT/JP2021/012287, filed Mar. 24, 2021, which is incorporated herein by reference, and which claimed priority to Japanese Patent Application No. 2020-064642, filed Mar. 31, 2020, the entire content of which is also incorporated herein by reference.

TECHNICAL FIELD

The present invention relates to a coil spring device.

Background Art

As a coil spring device that is used by being mounted on a suspension device, conventionally, a coil spring device including a main body spring in which a wire rod extends vertically in a spiral shape around a coil axis and an insulator which supports a lower end portion of the main body spring from below the main body spring is known. Here, the insulator is provided with a support groove which extends around a coil axis and into which the lower end portion of the main body spring is fitted, the lower end portion of the main body spring adheres to an inner surface of the support groove, and the inner surface of the support groove is provided with a plurality of spacer protrusions supporting an outer peripheral surface of the wire rod.

[Citation List]
[Patent Literature]
[Patent Document 1]
Japanese Unexamined Patent Application, First Publication No. 2017-15249

SUMMARY OF INVENTION

Technical Problem

With the conventional coil spring device however, there is room for improvement in reducing the cost while ensuring the adhesive strength between the lower end portion of the main body spring and the inner surface of the support groove.

The present invention is made in view of the above-described circumstances and an object of the present invention is to provide a coil spring device capable of reducing cost while ensuring an adhesive strength between a lower end portion of a main body spring and an inner surface of a support groove.

Solution to Problem

In order to solve the above-described problems, a coil spring device of a first aspect of the present invention includes: a main body spring in which a wire rod extends vertically in a spiral shape around a coil axis; and an insulator which supports a lower end portion of the main body spring from below the main body spring, wherein the insulator is provided with a support groove which extends around the coil axis and into which the lower end portion of the main body spring is fitted, wherein the lower end portion of the main body spring adheres to an inner surface of the support groove, wherein the inner surface of the support groove is provided with a plurality of spacer protrusions which support an outer peripheral surface of the wire rod, wherein the support groove extends in an angle range of 180° or more and 360° or less around the coil axis, and wherein a ratio of a volume of the spacer protrusions occupying a gap between the inner surface of the support groove and the outer peripheral surface of the wire rod at a center portion in the gap in a circumferential direction around the coil axis is larger than that at the other portions in the gap in the circumferential direction.

According to the present invention, the ratio of the volume of the spacer protrusion occupying the gap between the inner surface of the support groove and the outer peripheral surface of the wire rod at the center portion in the gap in the circumferential direction is larger than that at the other portions in the gap in the circumferential direction. Thus, when a compression force in the vertical direction is applied to the main body spring, in the adhesive layer between the lower end portion of the main body spring and the inner surface of the support groove, the volume of the adhesive layer at the center portion in the circumferential direction having a relatively low applied load becomes smaller, while for example, the volume of the adhesive layer at the end portion in the circumferential direction having a relatively high applied load becomes larger. As a result, it is possible to ensure the strength at the end portion in the circumferential direction. Accordingly, it is possible to reduce the used adhesive amount and the cost while ensuring the adhesive strength between the lower end portion of the main body spring and the inner surface of the support groove.

A second aspect of the present invention is the coil spring device of the first aspect of the present invention, wherein the plurality of spacer protrusions are formed to have the same size and shape.

In this case, since the plurality of spacer protrusions are formed to have the same size and shape, the plurality of spacer protrusions can be easily formed, and the outer peripheral surface of the wire rod can be easily supported on the plurality of spacer protrusions with little bias.

Advantageous Effects of Invention

According to the present invention, it is possible to reduce cost while ensuring an adhesive strength between a lower end portion of a main body spring and an inner surface of a support groove.

DESCRIPTION OF EMBODIMENTS

Figure 1:
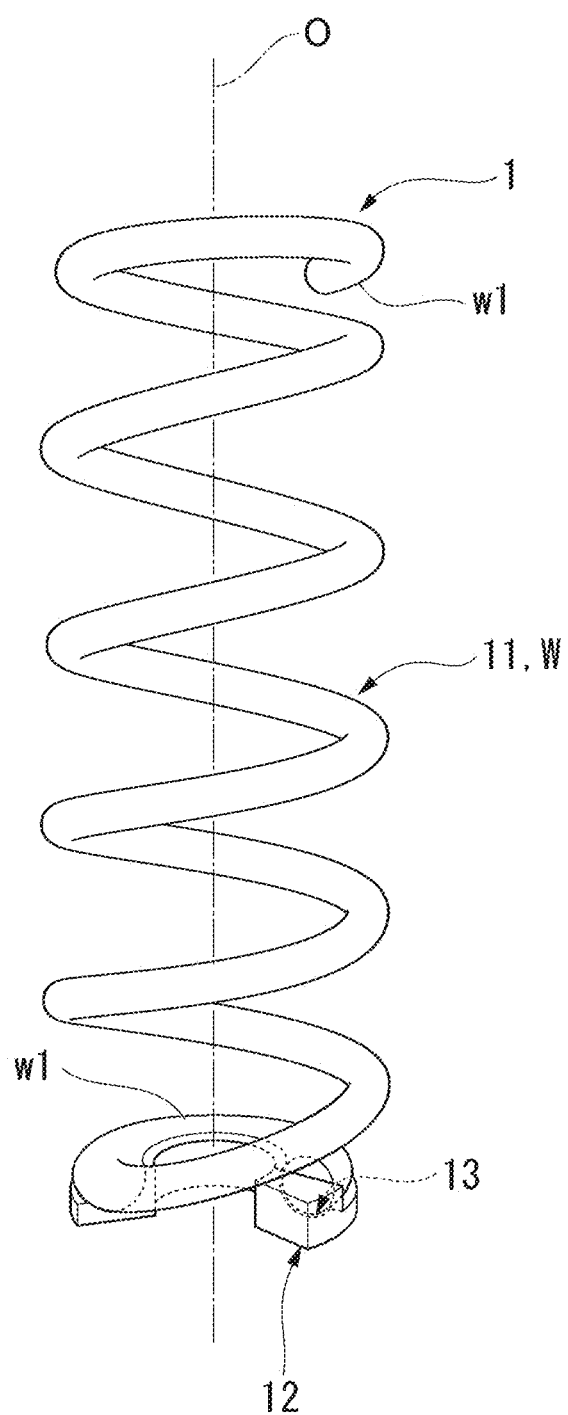
FIG. 1 is a perspective view of a coil spring device according to an embodiment of the present invention.
Figure 2:
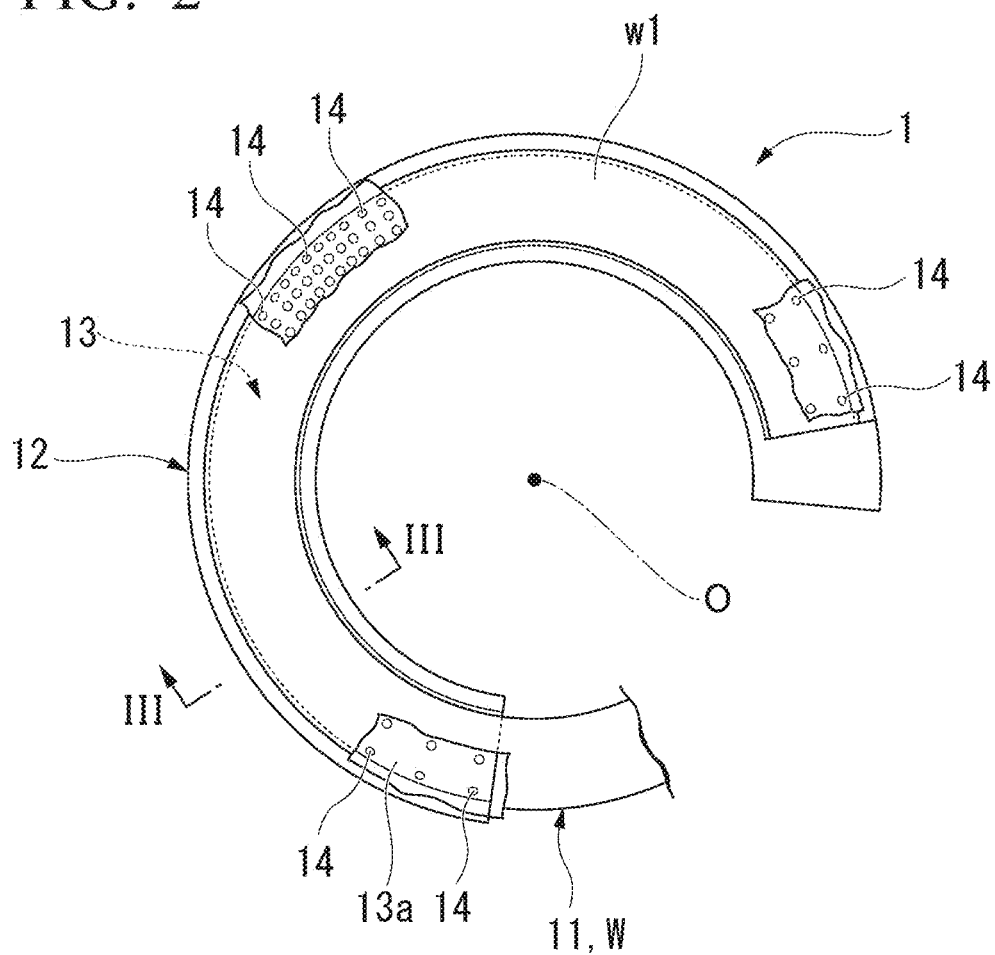
FIG. 2 is a plan view showing a part of the coil spring device of FIG. 1.
Figure 3:
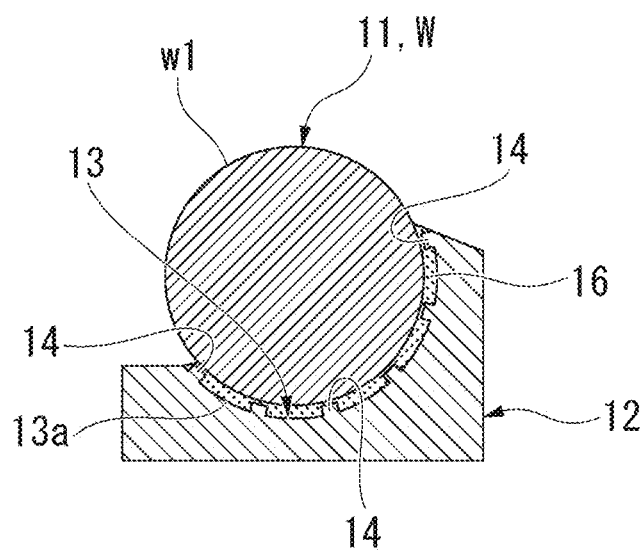
FIG. 3 is a cross-sectional view taken along a line of the coil spring device shown in FIG. 2.

Hereinafter, an embodiment of a coil spring device according to the present invention is described with reference to FIGS. 1 to FIG. 3.

A coil spring device 1 includes a main body spring 11 in which a wire rod W extends vertically in a spiral shape around a coil axis O and an insulator 12 which supports a lower end portion of the main body spring 11 from below the main body spring 11. That is, the vertical direction is the direction of the coil axis O. The coil spring device 1 is used by being mounted on, for example, a shock absorber inserted into the main body spring 11 and a suspension device having a strut mount mounted on the upper end of the shock absorber or the like.

The main body spring 11 is an open-end coil spring in which an end portion w1 of the wire rod W is vertically separated from the wire rod W adjacent to the end portion w1 on the inside of the direction of the coil axis O. The cross-sectional shape of the wire rod W is the same over the entire length including the end portion w1. In the example shown in the drawings, the cross-sectional shape of the wire rod W is a circular shape.

Additionally, a closed-end coil spring in which the end portion w1 of the wire rod W contacts and overlaps the wire rod W adjacent to the end portion w1 on the inside of the direction of the coil axis O may be adopted as the main body spring 11. In this configuration, the end portion w1 of the wire rod W may be subjected to, for example, grinding to form a flat surface extending in the horizontal direction orthogonal to the vertical direction and facing outward in the vertical direction. The cross-sectional shape of the wire rod W may be, for example, a rectangular shape or the like.

The insulator 12 is made of an elastic material such as rubber. As shown in FIG. 2, the insulator 12 has an arc shape extending around the coil axis O when viewed from the vertical direction. The insulator 12 extends over an angle range of 180° or more and 360° or less with respect to the coil axis O.

The insulator 12 is provided with a support groove 13 which extends around the coil axis O and into which the lower end portion of the main body spring 11 is fitted. The support groove 13 extends over an angle range of 180° or more and 360° or less with respect to the coil axis O. As shown in FIG. 3, an adhesive layer 16 is provided between an inner surface 13a of the support groove 13 and the lower end portion of the main body spring 11, where the lower end portion of the main body spring 11 adheres to the inner surface 13a of the support groove 13.

The inner surface 13a of the support groove 13 is formed in a concave curved shape curved along the outer peripheral surface of the wire rod W. The support groove 13 integrally opens toward one side in the circumferential direction around the coil axis O, upward, and outward in the radial direction (direction orthogonal to the direction of the coil axis O).

Additionally, as the support groove 13, for example, a configuration in which the support groove opens toward both circumferential sides, a configuration in which the radial outside of the support groove is closed, or the like may be adopted.

The inner surface 13a of the support groove 13 is provided with a plurality of spacer protrusions 14 which support the outer peripheral surface of the wire rod W.

The ratio of the volume of the spacer protrusion 14 occupying the gap between the inner surface 13a of the support groove 13 and the outer peripheral surface of the wire rod W exceeds 10% and the ratio of the volume of the adhesive layer 16 occupying the gap is less than 90%. The volume of the spacer protrusion 14 also includes the volume of the internal space of the spacer protrusion 14 when the spacer protrusion 14 has a tubular shape.

The ratio of the volume of the spacer protrusion 14 occupying the gap between the inner surface 13a of the support groove 13 and the outer peripheral surface of the wire rod W at the center portion in the gap in the circumferential direction around the coil axis O is larger than the ratio of the volume of the spacer protrusion 14 at the other portions in the gap in the circumferential direction. That is, the ratio of the volume of the adhesive layer 16 occupying the gap at the center portion in the gap in the circumferential direction is smaller rather than the ratio of the volume of the adhesive layer 16 occupying the gap at the other portions in the gap in the circumferential direction.

The center portion in the gap in the circumferential direction is a portion circumferentially sandwiched by the respective portions that are located on both circumferential sides of the circumferential center in the gap and separated by 5% or more and 45% or less of the entire circumferential length of the gap from the circumferential center in the gap (the circumferential center in the gap is a portion located at an equal distance from one end and the other end in the circumferential direction in the gap).

In the example shown in the drawings, the ratio of the volume of the spacer protrusion 14 occupying the gap gradually decreases as the distance in the circumferential direction from the center in the circumferential direction increases, and the ratio of the volume of the adhesive layer 16 occupying the gap gradually increases as the distance in the circumferential direction from the center in the circumferential direction increases. At the end portion in the circumferential direction in the gap, the ratio of the volume occupied by the spacer protrusion 14 is 10% or less and the ratio of the volume occupied by the adhesive layer 16 is 90% or more.

Additionally, the ratio of the volume of the spacer protrusion 14 occupying the gap may be the same in the entire area excluding the center portion in the circumferential direction in the gap or the entire area excluding the end portion in the circumferential direction in the gap. The ratio of the volume of the spacer protrusion 14 occupying the gap may exceed 10% in the entire area.

The difference between the ratio of the volume of the spacer protrusion 14 occupying the center portion in the circumferential direction in the gap and the ratio of the volume of the spacer protrusion 14 occupying the end portion in the circumferential direction in the gap is 80% or less.

If this difference exceeds 80%, the difference in the strength of the adhesive layer 16 between the center portion and the end portion in the circumferential direction becomes large, and the durability of the adhesive layer 16 may decrease.

The plurality of spacer protrusions 14 are formed to have the same size and shape. That is, the number of the spacer protrusions 14 per unit volume of the gap at the center portion in the circumferential direction is larger than that at the other portions in the gap in the circumferential direction. The plurality of spacer protrusions 14 are provided in the inner surface 13a of the support groove 13 at intervals in the circumferential direction and at intervals in the radial direction. The plurality of spacer protrusions 14 are provided over the entire area in the inner surface 13a of the support groove 13.

Additionally, the number of the spacer protrusions 14 per unit volume of the gap may be equal over the entire area of the gap and the size of the spacer protrusion 14 located at the center portion in the circumferential direction may be larger than the size of the spacer protrusion 14 located at the other portions in the gap. Further, the plurality of spacer protrusions 14 may have different shapes.

As described above, according to the coil spring device 1 of this embodiment, the ratio of the volume of the spacer protrusion 14 occupying the gap between the inner surface 13a of the support groove 13 and the outer peripheral surface of the wire rod W at the center portion in the gap in the circumferential direction is larger than that at the other portions in the gap in the circumferential direction. Thus, when a compression force in the vertical direction is applied to the main body spring 11, the volume of the adhesive layer 16 between the lower end portion of the main body spring 11 and the inner surface 13a of the support groove 13 at the center portion in the circumferential direction having a relatively low applied load becomes smaller. On the other hand, for example, the volume of the adhesive layer at the end portion in the circumferential direction having a relatively high applied load becomes larger and hence it is possible to ensure the strength at the end portion in the circumferential direction. Accordingly, it is possible to reduce the used adhesive amount and the cost while ensuring the adhesive strength between the lower end portion of the main body spring 11 and the inner surface 13a of the support groove 13.

Since the plurality of spacer protrusions 14 are formed to have the same size and shape, the plurality of spacer protrusions 14 can be easily formed and the outer peripheral surface of the wire rod W can be easily supported by the plurality of spacer protrusions 14 with little bias.

Additionally, the technical scope of the present invention is not limited to the above-described embodiment, and various modifications can be made without departing from the objective of the present invention.

In addition, the constituent elements in the above-described embodiment can be appropriately replaced with well-known constituent elements without departing from the objective of the present invention and the above-described embodiment and modified example may be appropriately combined.

Industrial Applicability

The present invention can be used in a coil spring device including a main body spring and an insulator having a support groove provided with a plurality of spacer protrusions.

What is claimed is:

1. A coil spring device comprising:
a main body spring in which a wire rod extends vertically in a spiral shape around a coil axis; and
an insulator which supports a lower end portion of the main body spring from below the main body spring,
wherein the insulator is provided with a support groove which extends around the coil axis and into which the lower end portion of the main body spring is fitted,
wherein the lower end portion of the main body spring adheres to an inner surface of the support groove,
wherein the inner surface of the support groove is provided with a plurality of spacer protrusions which support an outer peripheral surface of the wire rod,
wherein the support groove extends in an angle range of 180° or more and 360° or less around the coil axis, and
wherein a ratio of a volume of the spacer protrusions occupying a gap between the inner surface of the support groove and the outer peripheral surface of the wire rod at a center portion in the gap in a circumferential direction around the coil axis is larger than that at the other portions in the gap in the circumferential direction.

2. The coil spring device according to claim 1, wherein the plurality of spacer protrusions are formed to have the same size and shape.

* * * * *